UNITED STATES PATENT OFFICE.

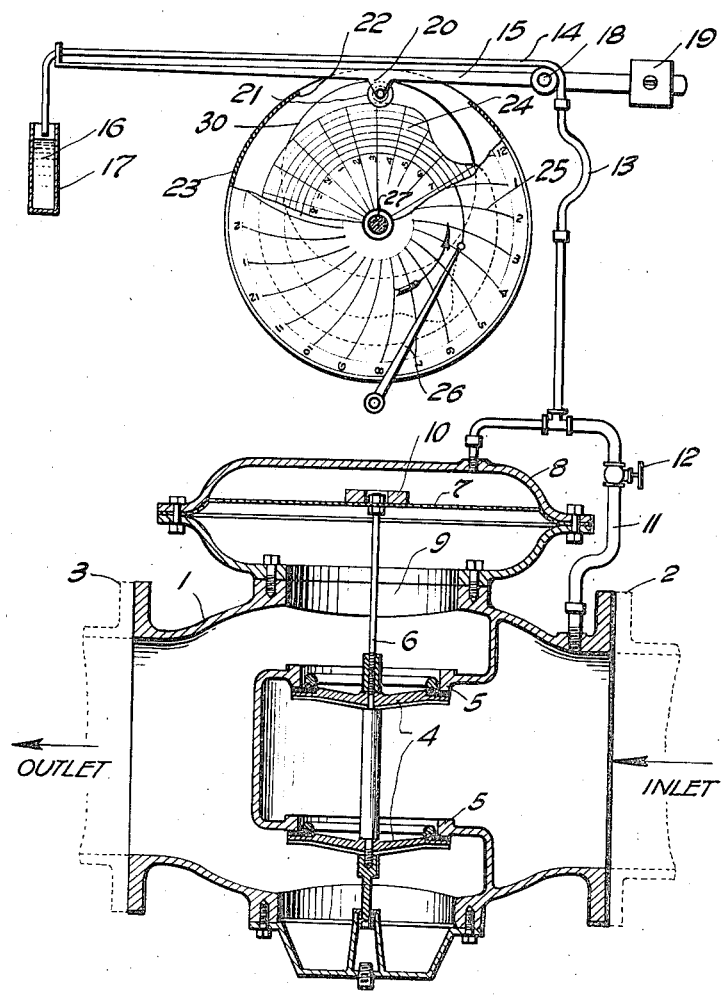

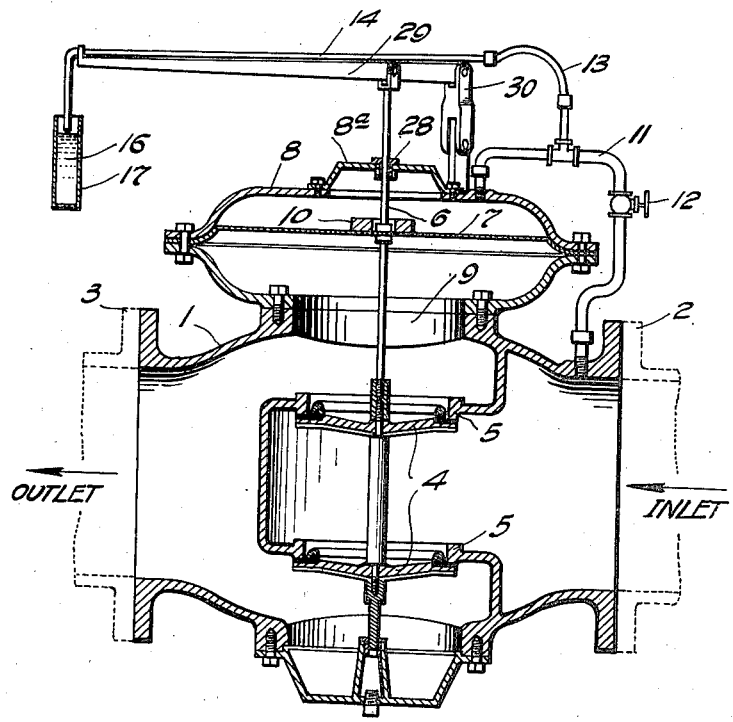

MACDOUGALD DEXTER, OF COLUMBUS, GEORGIA.

AUXILIARY CONTROL FOR PRESSURE-REGULATORS.

1,301,405.  Specification of Letters Patent.  Patented Apr. 22, 1919.

Application filed August 20, 1917. Serial No. 187,228.

*To all whom it may concern:*

Be it known that I, MACDOUGALD DEXTER, a citizen of the United States of America, residing at Columbus, in the county of Muscogee and State of Georgia, have invented certain new and useful Improvements in Auxiliary Controls for Pressure - Regulators, of which the following is a specification.

My invention relates to an auxiliary control means for pressure regulators designed to produce a uniform delivery pressure, and has for its object to modify the automatic regulating functions of the regulator so that the delivery pressure may be varied to meet different service conditions.

My invention is more particularly concerned with the distribution of gas, though it is applicable to any fluid distribution system. Heretofore, in the operation of gas distribution systems, the necessity has been apparent for increasing the pressure on the distribution side of the pressure regulators in order to compensate for the natural drop in pressure, due to the friction in the pipe lines, resulting from increased consumption. In other words, the mere regulation of the delivery pressure at the regulator is not sufficient to maintain the desired distribution pressure throughout the system and therefore the present types of pressure regulators, though reliable in their functions, do not meet the conditions which are contemplated in my invention.

One object of my invention is to provide an auxiliary control which will automatically influence the pressure regulator to increase the delivery pressure of the gas as the consumption increases, and as a preferred means to this end I make use of the principle of submerging the open end of a pipe in communication with a source of pneumatic pressure to develop in the pipe a variable pressure which is utilized to automatically modify the functions of a pressure regulator to obtain the desired delivery pressure. This automatic function can be obtained by exposing the valve controlling diaphragm to the developed pressure in such manner that the latter as it increases will tend to increase the extent the valve is opened.

Where the action of the pressure regulators is modified responsive to an increase in the flow or velocity of gas at the regulator to increase the pressure on the distribution side, there are many conditions arising in a gas distribution system which are not taken care of by this means, such, for instance, as the existence at different times for different districts of peak loads which in themselves are insufficient to modify the distribution of the entire system or to produce the automatic action on the part of the devices referred to. A further object of my invention therefore is to produce an increased pressure on the distribution side by means which are mechanically controlled so that the pressure regulator will function at the time and to the extent required to increase the distribution pressure so as to automatically meet these different conditions. A variety of means may be employed for thus modifying the action of the pressure regulator but that preferred is the employment of a time controlled means to regulate the pneumatic (gas or air) pressure on that side of the regulator diaphragm or float which will tend to open the valve.

More specifically I contemplate varying the pressure on the diaphragm or float that controls the regulator valve by exposing it to a constant flow of air or gas under pressure and varying the pressure of this air or gas by varying its point of discharge with reference to the surface of a liquid, the greater the depth of the point of discharge the greater being the counter-pressure established in the regulator and the greater the distribution pressure in the system.

My invention also contemplates taking advantage of the apparatus now in general use for recording gas pressure on a rotating chart as a means for controlling the air or gas auxiliary pressure, this control preferably being effected by a cam disk which supports the discharge end of the air or gas pipe supplying the auxiliary pressure and the periphery of which cam is deformed to effect the desired submersion of the pipe at the times when it is desired to build up this counter pressure in the regulator.

The principles underlying the application and operation of my invention will be more clearly understood my reference to the accompanying drawings which illustrate only the preferred embodiments of my invention, and in which:—

Figure 1 illustrates the embodiment of my invention in which the development of the auxiliary pressure for modifying the action of the pressure regulator is mechanically controlled.

Fig. 2 illustrates the embodiment of my invention in which the auxiliary pressure is automatically controlled.

Similar reference numerals refer to similar parts throughout the drawings.

In Fig. 1 I have shown a pressure regulator comprising a valve body 1 interposed between the high pressure supply main 2 and the low pressure distribution main 3. The valve 4 within the body is of the balanced type and is adapted to engage the seats 5, being controlled in its movements by a stem 6 connected to a diaphragm 7 mounted in an inclosed casing 8 attached to the valve body and exposed by a port 9 therein to the delivery pressure in the low pressure main 3. The diaphragm carries a dead weight 10. It will be understood that these parts form no part of my present invention and are illustrated merely as exemplary of the various types of pressure regulators with which those skilled in the art are familiar.

In applying my invention to the type of pressure regulator shown, I conduct air or gas under pressure from any suitable source, preferably from the high pressure main 2 through a pipe 11 under control of a regulating valve 12 to the diaphragm casing 8 above the diaphragm, and a branch of the pipe 11 beyond the regulating valve is connected by a flexible tubing 13 with a discharge pipe 14 mounted on a rocking arm 15 and having its open end down-turned and adapted to move with the arm to be submerged in a body of liquid, such as a body of mercury 16 in a container 17. The arm 15 is mounted to rock on a pivot 18 having a counter-weight 19 to partly counterbalance the weight of the pipe 14. The arm also carries a yoke 20 in which is rotatably mounted a grooved wheel 21. This wheel is adapted to project downwardly through a suitable opening 22 in the top of the casing 23 of a recording pressure gage and to ride upon the periphery of a cam disk 24 mounted to rotate with the chart 25 which is rotated by the recording gage in the manner well understood in this art. The pen arm 26 of the gage records the delivery pressure on said chart. Both the chart and the cam are detachably mounted on the arbor 27 of the gage which turns responsive to a time mechanism 30. The chart shown is for a twenty-four hour interval, during which time the chart and the cam will make one complete revolution. The cam is preferably formed of cardboard or like material which can have marked thereon a chart or scale by means of which its face can be subdivided for time by radial lines and for pressure by circumferential lines. This marking of the cam is desirable for facilitating the indenting of its periphery so as to produce by the resulting movement of the arm 15 and submergence of pipe 14 in the liquid 16 the desired counter-pressure above the diaphragm of the pressure regulator.

As illustrative of the operation of my invention, if the chart shows peak load conditions arising between the hours of ten and one in the day, and six to eight in the morning and evening, and indicates a pressure increase of two inches water column during these periods, the cam opposite the subdivisions thereof for the hours from six to eight morning and evening and from ten to one at noon, will be indented to sufficiently lower the arm 15 and with it submerge the end of the pipe 14 sufficiently to cause an increase in pressure above the diaphragm sufficient to open the main valve enough to raise the pressure on the distribution side to the required extent.

It will be observed that I avoid abrupt indentations in the cam periphery as I prefer to shape the cam so as to produce so gradual a movement of the pneumatic pipe 14 and so gradual a modification of the counter-pressure above the diaphragm that the increase or diminution of the delivery pressure will be unobserved in the distribution system and in this way I obtain a decided improvement over the mechanisms which are manually controlled and therefore produce so sudden a variation in pressure as to be objectionably noticeable throughout the distribution system.

In the embodiment of my invention illustrated in Fig. 2, the valve stem 6 is projected through a stuffing box 28 in the top of the diaphragm casing 8ª and is pivotally connected at an intermediate point to an arm 29 pivotally connected by a link 30 to the casing 8 and having mounted thereon the pneumatic pipe 14, the down-turned open end of which is adapted to be submerged in the body of liquid 16 in the container 17. The pressure developed in the pipe 14 is proportionate to the submergence in its open end in the body of liquid and is communicated through pipe 11 to the diaphragm casing above the diaphragm where it acts automatically to augment the opening of the regulator valve and increase the delivery pressure.

Having thus described my invention, what I claim as new and desire to secure by Letters Patent, is:—

1. A fluid pressure regulating means comprising a valve normally responsive in its movements to a variable factor of the fluid to be controlled, means to modify the normal action of said valve by pneumatic pressure under predetermined conditions, and means to control said pneumatic pressure by liquid pressure.

2. The combination with a pneumatic regulator of the type adapted to reduce a variable initial pressure to a constant delivery pressure, of a source of pneumatic pressure, a normally open pipe communicating with said source, a body of liquid, means to submerge the discharge end of said pipe in said liquid to develop a pressure in said pipe, and means responsive to said developed pressure to modify the functions of said regulator.

3. The combination with a pressure regulator comprising a regulating valve, of a source of pneumatic pressure, a normally open pipe leading therefrom, a body of liquid, means to produce a variable submergence of the open end of the pipe in the liquid to develop a variable pressure in said pipe, and means responsive to said developed pressure to modify the functions of said regulator.

4. In combination, a pressure regulator adapted to maintain a uniform delivery pressure, a pipe discharging a constantly flowing gas under pressure, a body of liquid, means to submerge the discharge end of said pipe to a variable extent in said liquid, and a movable element of said regulator responsive to the pressure in said pipe.

5. The combination with a pressure regulator adapted to maintain a uniform delivery pressure, and comprising a pressure controlled element and a valve moved thereby, of means to increase the valve opening pressure on said element comprising an open conduit supplied with gas under pressure, means to cause the pressure to rise in said pipe by resisting its escape therefrom, and means to communicate this increase in pressure to said pressure controlled element of the regulator.

6. In combination, a pressure regulator comprising an inclosed chamber, a diaphragm therein exposed on one side to the delivery pressure, a pressure regulating valve controlled by the diaphragm, a pipe connected at one end to a source of pneumatic pressure and open both to the other side of said diaphragm and to the atmosphere, means to raise and lower the end of said pipe that is open to the atmosphere, and a body of liquid into which said movable end of the pipe is submerged, as and for the purposes described.

7. The combination with a pressure regulator adapted to maintain a uniform delivery pressure, of a time measuring instrument comprising a rotatable cam element, an open pipe supplied with gas under pressure, a body of liquid, means controlled by said cam to submerge the discharge end of the pipe in said liquid, and means to communicate the resulting pressure in said pipe to the pressure regulator to modify its action and increase the delivery pressure.

In testimony whereof I affix my signature.

MacDOUGALD DEXTER.

Witness:
 NOMIE WELSH.